(12) United States Patent
Inoue et al.

(10) Patent No.: US 6,294,624 B1
(45) Date of Patent: Sep. 25, 2001

(54) MODIFIED DIENE ELASTOMER AND ITS PREPARATION

(75) Inventors: Tokuji Inoue; Tetsuji Nakajima, both of Ichihara; Kiyoshige Muraoka; Noriko Yagi, both of Kobe, all of (JP)

(73) Assignees: Ube Industries, Ltd., Ube; Sumitomo Rubber Industries, Ltd., Kobe, both of (JP)

( * ) Notice: Subject to any disclaimer, the term of this patent is extended or adjusted under 35 U.S.C. 154(b) by 0 days.

(21) Appl. No.: 09/489,781

(22) Filed: Jan. 24, 2000

(30) Foreign Application Priority Data

Jan. 22, 1999 (JP) .................................................. 11-014017
Jun. 4, 1999 (JP) .................................................. 11-158686
Aug. 3, 1999 (JP) .................................................. 11-219581

(51) Int. Cl.$^7$ ...................................................... C08F 4/42
(52) U.S. Cl. ........................ 526/93; 526/348.6; 526/103; 526/128; 526/124.8; 526/164; 526/165; 525/102; 524/262
(58) Field of Search ................................... 526/93, 348.6, 526/164, 165, 103, 124.8, 128; 525/100, 102; 524/262

(56) References Cited

U.S. PATENT DOCUMENTS 6,147,174 * 11/2000 Holtcamp et al. .................. 526/160

* cited by examiner

Primary Examiner—James J. Seidleck
Assistant Examiner—Olga Asinovsky

(57) ABSTRACT

A modified diene elastomer prepared by a process comprising the steps of polymerizing a diolefin compound containing a conjugated double bond in a liquid phase in the presence of a cobalt compound, an organic aluminum compound containing a halogen atom, and water, to give a solution containing a diene elastomer, and reacting the diene elastomer with an elastomer-modifying compound is favorably employed for the manufacture of tire tread, particularly when it is employed in combination with silica as a filler.

20 Claims, No Drawings

MODIFIED DIENE ELASTOMER AND ITS PREPARATION

FIELD OF THE INVENTION

The present invention relates to a modified diene elastomer, a process for preparing the modified diene elastomer, and an elastomer composition favorably employable for manufacture of tire tread.

BACKGROUND OF THE INVENTION

Diene elastomers such as polybutadienes and butadiene styrene copolymers are employed for manufacture of tire treads of automobiles. Recently, demands for elastic materials showing low rolling resistance and high road gripping property have been increased for the manufacture of tire treads, from the viewpoints of reduction of fuel consumption and increase of driving performances on snow-covered roads and ice-covered roads.

It has been proposed to introduce specific functional groups into the elastic material by reacting the elastic material having alkali metal atoms with a reactive compound so as to impart the required characteristics to the elastic material. Until now, however, there are not provided satisfactorily modified elastic materials. Particularly, the modified elastic material produced by the known reaction is unsatisfactory in that it has low cis-1,4 unit contents in its molecular structure and shows abrasion resistance lower than that of elastic material having a high cis unit content.

It is known that an elastomer having a high cis-unit content is reacted with an elastomer-modifying agent in the presence of a catalyst in an elastomer solution to give a modified elastomer. For instance, Japanese Patent Provisional Publication No. 58-142901 describes modification of elastomer by reacting an unsaturated bond-containing elastomer with an organic compound having a carboxyl group and an aldehyde group in an elastomer solution in the presence of an acid catalyst. Japanese Patent Provisional Publication No. 58-162602 describes a reaction of an unsaturated bond-containing elastomer with an organic compound having a carboxyl group and a salt of an aromatic sulfone-haloamide in an elastomer solution to give a modified elastomer. Japanese Patent Provisional Publication No. 61-225202 describes modification of elastomer by reacting an unsaturated bond-containing elastomer with an elastomer-modifying organic compound such as benzylidene butylamine or an organic acid halide in an elastomer solution in the presence of a Lewis acid catalyst.

As described above, most of known processes for the elastomer-modification necessarily employ an organic solvent for preparing the elastomer solution from a once isolated elastomer. It is not advantageous to produce the modified elastomer from the isolated elastomer, and it is preferred to modify an elastomer in its reaction mixture (i.e., without isolation) to obtain the desired modified elastomer. It also is a problem that the amount of the solvent employed for the preparation of an elastomer solution is quite large. The use of such a large amount of an organic solvent is disadvantageous from the viewpoint of the industrial production of modified elastomers.

It is known that transition metal catalysts such as Co-containing catalyst, Ni-containing catalyst, Ti-containing catalyst, and Nd-containing catalyst is favorably employable for preparing an elastomer having a high cis-unit content. However, the elastomer prepared using one of the Co-containing catalyst, Ni-containing catalyst and Ti-containing catalyst is not living, namely, not a living polymer, and hence it is difficult to modify the non-living polymer with an elastomer-modifying agent.

In contrast, the Nd-containing catalyst can give a pseudo-living elastomer in the preparation of diene polymer, which can be modified with an elastomer-modifying agent. For instance, Japanese Patent Provisional Publication No. 63-178102 describes the modification of a polymer prepared from a conjugated diene in the presence of lanthanide rare earth metal catalyst with a specific organometal halide. The modification reaction is performed just after the diene polymer is prepared. Japanese Patent Provisional Publication No. 63-297403 describes a process for preparing a modified diene polymer which comprises a step of producing a polymer from a conjugated diene in the presence of a lanthanide rare earth metal catalyst and a step of immediately reacting the polymer with a specific hetero-cumulene compound or hetero-three-membered cyclic compound. Japanese Patent Provisional Publication No. 63-305101 describes a similar process for preparing a modified diene polymer using a specific halogen-containing compound such as 2,4,6-trichloro-1,3,5-triazine as the modifying agent.

The use of a lanthanide rare earth metal catalyst can give a pseudo-living diene polymer which is easily modified to obtain the desired modified elastomer. However, the polymerization reaction using the lanthanide rare earth metal catalyst is low in its reaction rate per the amount of catalyst, as compared with the case using a Co-containing catalyst. The Co-containing catalyst has been believed not to give a living or pseudo-living polymer after polymerization of a diene compound.

SUMMARY OF THE INVENTION

It is an object of the present invention to provide a process for preparing a modified diene elastomer having a high cis-unit content, which is favorably employed as an industrial production process.

It is another object of the invention to provide an elastomer con-position which is favorably employable for the manufacture of tire treads of automobiles.

As a result of studies by the inventors, it is now discovered that a cobalt-containing catalyst can give a polymer having an reactivity and a high cis-unit content from a diene compound when it is employed in combination with a halogen-containing organic aluminum compound and water, and that the resulting reactive polymer is easily modified using a known elastomer modifying compound to give the desired elastomer having a favorably low rolling resistance and high road gripping property.

Accordingly, the present invention resides in a process for preparing a modified diene elastomer which comprises the steps of:

polymerizing a diolefin compound containing a conjugated double bond in a liquid phase in the presence of a cobalt compound, an organic aluminum compound containing a halogen atom, and water, to give a solution containing a diene elastomer; and reacting the diene elastomer with an elastomer-modifying compound.

The invention also resides in a modified diene elastomer containing at least 80% of cis-1,4-structure units in its recurring units, a Mooney viscosity of 20 to 80 in terms of $ML_{1+4}$ at 100° C., and a weight average molecular weight of 200,000 to 1,000,000 measured by a gel permeation method, which is prepared by a process comprising the steps of polymerizing a diolefin compound containing a conjugated double bond in a liquid phase in the presence of a cobalt compound, an organic aluminum compound containing a halogen atom, and water, to give a solution containing a diene elastomer, and reacting the diene elastomer with an elastomer-modifying compound.

The invention resides further in an elastomer composition comprising an elastomer component which is composed of 10 to 80 weight % of a modified diene elastomer containing at least 80% of cis-1,4-structure units in its recurring units, a Mooney viscosity of 20 to 80 in terms of $ML_{1+4}$ at 100° C., and a weight average molecular weight of 200,000 to 1,000,000 measured by a gel permeation method, which is prepared by a process comprising the steps of polymerizing a diolefin compound containing a conjugated double bond in a liquid phase in the presence of a cobalt compound, an organic aluminum compound containing a halogen atom, and water, to give a solution containing a diene elastomer, and reacting the diene elastomer with an elastomer-modifying compound, and 20 to 90 weight % of one or more other elastomer compounds, and silica in an amount of 5 to 100 weight parts per 100 weight parts of the elastomer component.

The invention resides furthermore in a tire tread employing an elastomer composition comprising an elastomer component which is composed of 10 to 80 weight % of a modified diene elastomer containing at least 80% of cis-1,4-structure units in its recurring units, a Mooney viscosity of 20 to 80 in terms of $ML_{1+4}$ at 100° C., and a weight average molecular weight of 200,000 to 1,000,000 measured by a gel permeation method, which is prepared by a process comprising the steps of polymerizing a diolefin compound containing a conjugated double bond in a liquid phase in the presence of a cobalt compound, an organic aluminum compound containing a halogen atom, and water, to give a solution containing a diene elastomer, and reacting the diene elastomer with an elastomer-modifying compound, and 20 to 90 weight % of one or more other elastomer compounds, and silica in an amount of 5 to 100 weight parts per 100 weight parts of the elastomer component.

DETAILED DESCRIPTION OF THE INVENTION

The present invention is described below in more detail.

In the first step of the process of the invention is performed by polymerizing a diolefin compound containing a conjugated double bond in a liquid phase in the presence of a cobalt compound, an organic aluminum compound containing a halogen atom, and water, to give a solution containing a diene elastomer.

Examples of the diolefin compounds containing a conjugated double bond include 1,3-butadiene and isoprene. A mixture of 1,3-butadiene and isoprene is also employed.

The cobalt compound employed as a catalyst component preferably is a cobalt salt or a cobalt complex. Preferred examples of the cobalt compounds include cobalt halides such as cobalt chloride and cobalt bromide, cobalt salts of an inorganic acid such as cobalt nitrate, cobalt salts of a carboxylic acid having 1 to 18 carbon atoms such as cobalt octylate, cobalt acetate and cobalt octoate, cobalt naphthenate, cobalt malonate, cobalt bis(acetylacetonate), cobalt tris(acetylacetonate), cobalt-ethyl acetate complex, a triarylphosphine complex of cobalt halide, a trialkyl phosphine complex of cobalt halide, organic base complexes (e.g., pyridine or picoline complex) of cobalt halide, cobalt-ethyl alcohol complex. Preferred cobalt compounds are cobalt salts of a carboxylic acid having 1 to 18 carbon atoms.

The halogen atom-containing organic aluminum compound preferably has the following formula:

$$R_{3-q}AlX_q$$

in which R is a hydrocarbyl group having 1 to 10 carbon atoms, X is a halogen atom, and q is 1 or 2.

Examples of the halogen atom-containing organic aluminum compounds include dialkylaluminum halides such as dialkylaluminum chloride and dialkylaluminum bromide, alkylaluminum sesquihalides such as alkylaluminum sesquichloride and alkylaluminum sesquibromide, and alkyl aluminum dihalides such as alkylaluminum dichloride and alkylaluminum dibromide. Examples of concrete compounds are diethylaluminum monochloride, diethylaluminum monobromide, dibutylaluminum monochloride, ethylaluminum sesquichloride, ethylaluminum dichloride, dicyclohexylaluminum monochloride, and diphenylaluminum monochloride. Preferred are dialkylaluminum halides, alkylaluminum dihalides and alkylaluminum sesquihalides, all of which have 2 to 10 carbon atoms (total carbon atoms in one compound).

The cobalt compound, halogen atom-containing organic aluminum compound, and water which constitute the catalyst composition are preferably employed in the following amounts:

Cobalt compound: $1 \times 10^{-7}$–$1 \times 10^{-3}$ mole (per one mole of diolefin compound)

Aluminum compound: $1 \times 10^{-5}$–$1 \times 10^{-1}$ mole (per one mole of diolefin compound)

Water: $1 \times 10^{-5}$–$1 \times 10^{-1}$ mole. (per one mole of diolefin compound)

The cobalt compound, halogen atom-containing aluminum compound and water can be introduced into a reaction mixture for the polymerization reaction at one time or separately in optional orders.

The polymerization reaction of the starting conjugated diolefin compound can by performed in any known methods such as bulk polymerization and solution polymerization. For the solution polymerization, a solvent such as an aromatic hydrocarbon (e.g., toluene, benzene, or xylene), an aliphatic hydrocarbon (e.g., n-hexane, butane, heptane, or pentane), an alicyclic hydrocarbon (e.g., cyclopentane or cyclohexane), an olefinic hydrocarbon (e.g., 1-butene, cis-2-butene, or trans-2-butene), or other hydrocarbon (e.g., mineral spirit, solvent naphtha, or kerosene). The diolefin compound per se may serve as the solvent. An organic solvent which dissolves the diolefin compound, the diene elastomer, and the modified diene elastomer is preferably employed. Preferred organic solvents are benzene, cyclohexane, and a mixture of cis-2-butene and trans-2-butene.

In the polymerization reaction of the invention, a known molecular weight modifier such as a non-conjugated diene (e.g., cyclooctadiene or allene) or an α-olefin (e.g., ethylene, propylene, or butene-1) can be employed.

The polymerization reaction is preferably carried out at a temperature in the range of −30 to 100° C., more preferably 30 to 80° C., for a period of 10 min. to 12 hrs., more preferably for a period of 30 min. to 6 hrs. The polymerization is generally performed at an atmospheric pressure or increased pressure up to 10 atm. (gauge pressure).

Immediately after the polymerization reaction is complete, the modifying reaction is performed, preferably, by introducing an elastomer modifying compound into the polymerization reaction mixture.

A number of elastomer modifying compounds are known. Preferred are an organic silicon compound having an amino group and an alkoxy group, an organo-alkoxysilane, and an organo-aroxysilane.

Examples of the organic silicon compounds having an amino group and an alkoxy group include 3-aminopropyldimethylmethoxysilane, 3-aminopropylmethyldimethoxysilane, 3-aminopropyltrimethoxysilane, 3-aminopropyldimethylethoxysilane, 3-aminopropylmethyldiethoxysilane, 3-aminopropyltriethoxysilane, 3-aminopropyldimethylbutoxysilane, 3-aminopropylmethyldibutoxysilane, 3-(2-aminoethylaminopropyl)dimethoxymethylsilane, 3-(2-aminoethylamono-propyl)dimethoxyethylsilane, 3-(2-aminoethylaminopropyl)dimethoxypropylsilane, 3-(2-aminoethylaminopropyl)dimethoxybutylsilane, 3-(2-aminoethylaminopropyl)diethoxymethylsilane, 3-(2-aminoethylaminopropyl)trimethoxysilane, 3-(2-aminoethylaminopropyl)triethoxysilane, and 3-(2-aminoethylaminopropyl)tributoxysilane. Preferred are 3-aminopropyltrimethoxysilane, 3-(2-aminoethylaminopropyl)dimethoxymethylsilane and 3-(2-aminoethylpropyl)trimethoxysilane. The organic silicon compounds can be employed in combination for the elastomer modification.

The organo-alkoxysilane or organo-aroxysilane employable as the elastomer-modifying compound preferably has the following formula (I):

$$R^1{}_k(R^2O)_m SiH_n \qquad (I)$$

in which each of $R^1$ and $R^2$ independently represents a hydrocarbyl group having 1 to 20 carbon atoms, k is an integer of 0 to 3, m is an integer of 1 to 4, and n is an integer of 0 to 3, provided that k+m+n is 4.

In the formula (I), it is preferred that $R^1$ is an alkyl group having 1 to 8 carbon atoms, an aryl group having 6 to 12 carbon atoms, or an aralkyl group having 7 to 13 carbon atoms, and that $R^2$ is an alkyl group having 1 to 10 carbon atoms, an aryl group having 6 to 12 carbon atoms, or an aralkyl group having 7 to 13 carbon atoms.

Examples of the organo alkoxysilanes and organo aroxysilanes include ethyltrimethoxysilane, triethoxysilane, butyltrimethoxysilane, methyltriethoxysilane, tetraethoxysilane, ethyltriethoxysilane, phenyltrimethoxysilane, hexyltrimethoxysilane, tetrabutoxysilane, tetraphenoxysilane, methyltripropoxysilane, methyltriisopropoxysilane, pentyltriethoxysilane, phenyltriethoxysilane, octyltriethoxysilane, tripentyloxysilane, tetramethoxysilane, ethoxytrimethylsilane, diethoxydimethylsilane, butoxytrimethylsilane, isobutoxytrimethylsilane, 1-methylpropoxytrimethylsilane, tert-butoxytrimethylsilane, butoxytrimethylsilane, dimethyldipropoxysilane, diethoxydiethylsilane, and methoxytripropoxysilane. Preferred are tetramethoxysilane, methyltrimethoxysilane, tetraethoxysilane, trimethoxysilane, methyldimethoxysilane, dimethylmethoxysilane, ethyldimethoxysilane, diethylmethoxysilane, methyldiethoxysilane, dimethylethoxysilane, ethyldiethoxysilane, diethylethoxysilane, tributoxysilane, methyldibutoxysilane, dimethylbutoxysilane, ethyldibutoxysilane, and diethylbutoxysilane. These elastomer-modifying compounds can be used singly or in combination.

The elastomer-modifying compound is employed generally in an amount of 0.01 to 150 mmol., preferably 1 to 100 mmol, most preferably 3 to 50 mmol., per 100 g of the diene polymer produced by the polymerization of diolefin compound. If the amount of the elastomer-modifying compound is too small, satisfactory modification may not be accomplished. If an excessive amount of the elastomer-modifying compound is used, not a small amount of the modifying compound remains in the resulting diene polymer. Sometimes, it may be required to remove the remaining modifying compound from the diene polymer, if its amount is large.

The modification reaction is preferably carried out at a temperature of 0 to 100° C., more preferably from room temperature to 70° C. If the reaction temperature is too low, the reaction does not smoothly proceed. If the reaction temperature is too high, gelation occurs in the reaction mixture. Generally, the modification reaction is carried out at a temperature similar to the reaction temperature of the polymerization reaction. The modification reaction is carried out for 0.5 to 6 hours.

If desired, a modification-accelerating catalyst such as an aluminum halide or an alkyl halide having a alkyl group of $C_1$ to $C_6$ may be added to the polymerization reaction mixture in advance of adding the elastomer-modifying compound, so as to accelerate the modification reaction. Examples of the aluminum halides include aluminum chloride, aluminum bromide, and aluminum iodide. Examples of the alkyl halides include ethyl bromide, ethyl iodide, butyl chloride, butyl bromide, and butyl iodide. The modification-accelerating catalyst is generally employed in an amount of 0.01 to 50 mmol., preferably 0.05 to 30 mmol., more preferably 0.1 to 20 mmol., per 100 g of the diene polymer.

The process of the invention for polymerizing a diolefin compound and modifying the resulting diene polymer can give a modified diene elastomer containing at least 80% of cis-1,4-structure units in its recurring units, a Mooney viscosity of 20 to 80 in terms of $ML_{1+4}$ at 100° C., and a weight average molecular weight of 200,000 to 1,000,000 measured by a gel permeation method. The molecular weight distribution in terms of Mw/Mn (weight average molecular weight/number average molecular weight) preferably is in the range of 1 to 3.

The modified diene elastomer of the invention preferably has a nitrogen content in an amount of 10 to 5,000 ppm, if the nitrogen atom-containing modifying compound is employed, and preferably has a silicon content in an amount of 10 to 5,000 ppm (preferably 30 to 1,000 ppm), if the organo alkoxysilane or organo aroxysilane is employed as the modifying compound.

The modified diene elastomer can be mixed, if desired, after blending with other synthetic elastomers and/or natural elastomers, with a process oil, a filler such as carbon black, a vulcanizing agent, a vulcanization accelerator, and/or one or more other known additives, to give an elastomer composition for the manufacture of tire, elastic hose, elastic belt, and other industrial elastomer materials. The modified diene elastomer of the invention can be employed for modification of plastic materials.

The modified diene elastomer of the invention is favorably employable particularly for manufacturing industrial materials which require high mechanical characteristics and improved abrasion resistance. Therefore, the modified diene elastomer of the invention is very advantageously employed for the manufacture of tire treads.

In the industrially employable elastomer composition, the modified diene elastomer is preferably incorporated into an elastomer composition in an amount of 10 weight % or more, preferably, not less than 15 weight % but not more than 80 weight % (more preferably not more than 75 weight %), based on the total amount of the elastomer mixture in the composition. In other words, it is preferred that 10 to 80 weight parts of the modified diene elastomer of the invention are preferably combined with 20 to 90 weight parts of one or more other elastomer components. Examples of the other elastomer components include unmodified styrene-butadiene elastomer, isoprene elastomer, styrene-isoprene-butadiene elastomer, ethylene-propylene-diene elastomer, chloroprene elastomer, and acrylonitrile-butadiene elastomer.

The elastomer composition of the invention preferably contains silica in an amount of 5 to 100 weight parts (more preferably 10 to 85 weight parts, most preferably 20 to 65 weight parts), per 100 weight parts of the elastomer component. In this case, it is preferred that a silane coupling agent is further contained in an amount of at most 15 weight parts, preferably at most 10 weight parts, more preferably in an amount of 0.5 to 8 weight parts, per 100 weight parts of the silica.

There are no specific limitations with respect to the silica employable in combination with the modified diene elastomer of the invention. Silicic acid anhydride (silica produced by dry process) and hydrated silica (silica produced by wet process) both are employable. The hydrated silica is preferably employed. Examples of the hydrated silica include Ultrasil VN3 (tradename, available from Degussa Corporation) and Nipseal VN3 AQ (tradename, available from Nippon Silica Co., Ltd.) Moreover, the silica preferably has a nitrogen-adsorption specific surface area ($N_2SA$) in the range of 50 to 300 $m^2/g$. A silica having an extremely small $N_2SA$ may bring about unsatisfactory dispersion improvement and poor reinforcing characteristics. A silica having an extremely large $N_2SA$ may not be well dispersed and may cause disadvantageous exothermic reaction.

The silane-coupling agent can reinforce adhesion of silica to the elastomer component so that the elastomer composition may have increased abrasion resistance. Any known silane-coupling agents can be employed. Examples of the silane-coupling agents include bis(3-triethoxysilylpropyl) tetrasulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-nitropropyltrimethoxysilane, 3-nitropropyltriethoxysilane, 3-chloropropyltrimethoxysilane, 3-chloropropyltriethoxysilane, 2-chloroethyltrimethoxysilane, 2-chloroethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylcarbamoyl tetrasulfide, 3-trimethoxysilylpropylbenzothiazol tetrasulfide, 3-triethoxysilylpropylbenzothiazol tetrasulfide, 3-triethoxysilylpropylmethacrylate monosulfide, and 3-trimethoxysilylpropylmethacrylate monosulfide. Most preferred is bis(3-triethoxysilylpropyl)tetrasulfide.

The elastomer composition of the invention may further contain carbon black having a $N_2SA$ of 30 to 200 $m^2/g$ and a compressed dibutyl phthalate absorption value (24M4 DBP absorption) of 30 to 150 mL/100 g. Examples of the commercially available carbon blacks include HAF, ISAF, and SAF.

The present invention is further described by the following examples. In the following examples, the Mooney viscosity ($ML_{1+4}$, 100° C.), cis-1,4 unit content, nitrogen content, weight average molecular weight, molecular weight distribution, and gel content are determined by the following methods:

(1) Mooney viscosity ($ML_{1+4}$, 100° C.)

determined at 100° C. by measurement of 4 minutes after one minute-preheating, according a method defined in JIS-K6300, utilizing a Mooney viscosity SMV-200 (available from Shimadzu Seisakusho Ltd.)

(2) Cis-1,4 unit content (%)

determined by measurement of micro-structure of the polymer in 0.4 weight % solution in carbon disulfide by infrared spectral analysis.

(3) Nitrogen content (ppm)

determined by Kjeldahl method according to the method defined in JIS-K0102.

(4) Weight average molecular weight and molecular weight distribution determined by gel permeation chromatography (GPC) using tetrahydrofuran as a solvent in a GPC apparatus (available from Toso Co., Ltd.) to give a molecular weight distribution curve and calculations of a weight average molecular weight (Mw) and a number average molecular weight using a calibration curve (reference: polystyrene). Then, the molecular weight distribution (Mw/Mn) is calculated.

(5) Gel content (%)

Approximately 0.5 g of an unvulcanized rubber (i.e., elastomer) sample is finely cut and weighed to determine its accurate weight (Rg). A stainless steel basket (100 mesh) is weighed to give its accurate weight (Kg). All of the weighed rubber sample is transferred into the basket to determine its total weight (Rg+Kg). The basket having the rubber sample is immersed at 23° C., for 24 hours in 100 mL of toluene which is placed in a bottle with plug. The basket is then taken out to dry its content at 23° C., for 24 hours under reduced pressure. The content is further dried at 70° C., for 24 hours under reduced pressure, until the content shows a constant weight. The resulting toluene-insoluble content is accurately weighed together with the basket to determine Gg (toluene insoluble content)+Kg. The gel content is calculated by the following equation:

$$\text{Gel content (\%)}=100\times[Gg-(Rg\times(\text{weight of filler/whole weight of elastomer composition})]/[R\times(\text{weight of rubber component})/(\text{whole weight of elastomer composition})]$$

Remarks:

Weight of filler: Weight of carbon black (see Table 1)

Weight of elastomer composition: Weight of whole components (see Table 1)

Weight of rubber component: Weight of whole rubber component (e.g., NR+BR or modified BR, see Table 1).

The 300% modulus of elasticity ($M_{300}$), rolling resistance, tensile strength, and wet skid resistance index are determined by the following methods.

(1) 300 Modulus of elasticity ($M_{300}$)

determined according to the method defined in JIS-K6301.

(2) Rolling resistance index determined by measuring tan a at 70° C. under the condition of 10% of initial strain and 2% of dynamic strain using a viscoelastometer VES (available from Iwamoto Seisakusho Co., Ltd.) and calculating the rolling resistance index according to the equation described below:

Rolling resistance index=100×[value measured in Comparison Example (unmodified sample)/value measured in Example (modified sample)]

The higher rolling resistance index means that the rolling resistance is lower.

(3) Tensile strength determined according to the method defined in JIS-K6301.

(4) Wet skid resistance index determined according to the method defined in ASTM-E303-83 using a portable skid resistance meter (available from Stanley Co., Ltd.). The higher index value means that the gripping performances (driving, breaking and controlling) on wet road is high.

EXAMPLE 1

In a 1.5 L-volume stainless steel-made autoclave having been purged with gaseous nitrogen was placed a solution of 1,3-butadiene in 1 L of a mixture of benzene and $C_4$ distillate (butadiene concentration: 27.9 wt. %, benzene content: 26.9 wt. %, content of $C_4$ distillate mainly composed of cis-2-butene: 45.2 wt. %). To the solution were added 2 mmol. of water and 2.9 mmol. of diethylaluminum chloride. The mixture was then stirred. To the mixture was further added 4.24 mmol. of cyclooctadiene. The autoclave was heated until its inner temperature reached 58.50° C. Then, 0.0087 mmol. of cobalt octoate was added, and polymerization reaction was carried out at 60° C., for 30 minutes. Immediately after completion of the polymerization reaction, 1.78 mmol. of 3-(2-aminoethylaminopropyl)trimethoxysilane (i.e., elastomer modifying compound) was added to the reaction mixture, and then the reaction mixture was heated at the same temperature, for 120 min., so that the polymerized product was modified.

After the modifying reaction was complete, unreacted gas was discharged, and 500 mL of toluene was added to the modified polymer (i.e., modified polybutadiene) to prepare a toluene solution of the modified polybutadiene. To the toluene solution was added 500 mL of methanol, and the mixture was stirred for 10 minutes. The stirring was terminated, and the content of the autoclave was transferred into a separate vessel of 2 L volume. The modified butadiene was then isolated by filtration. The modified butadiene was then dissolved in 800 mL of toluene, and precipitated by the addition of 800 mL of methanol. The precipitate was then isolated by filtration. This dissolution/precipitation/isolation procedure was repeated three times.

To the finally isolated modified polybutadiene were added 0.11 phr. of Irganox-1010 [oxidation inhibitor: tetrakis (methylene-3-(3,5-di-t-butyl-4-hydroxyphenyl)-propionate) methane] and 0.45 phr. of tris(nonylphenyl)-phosphite (antioxidant or age resister). The mixture was then kneaded, and dried at 100° C., for 1.5 hrs., under reduced pressure, to obtain a modified polybutadiene product.

EXAMPLE 2

The procedures of Example 1 were repeated except for using 3-(2-aminoethylaminopropyl)dimethoxymethylsilane as the modifying compound, to obtain a modified polybutadiene product.

EXAMPLE 3

The procedures of Example 1 were repeated except for using 3-aminopropyltrimethoxysilane as the modifying compound, to obtain a modified polybutadiene product.

EXAMPLE 4

The procedures of Example 1 were repeated except for changing the amount of 3-(2-aminoethylaminopropyl) trimethoxysilane to 0.95 mmol., to obtain a modified polybutadiene product.

Comparison Example 1

The procedures of Example 1 were repeated except for performing no modification procedure, to obtain an unmodified polybutadiene product.

Characteristics of Vulcanized Polybutadiene Product (1) Each of the polybutadiene products (modified or unmodified) produced in Example 1 to 4 and Comparison Example 1 was blended according to the formulation given in Table 1 to prepare an elastomer composition. The blended elastomer compositions were press-cured at 150° C., for 30 min., to prepare Vulcanized Products A, B, C, D, and E.

TABLE 1

| Components | Amount (weight part) |
| --- | --- |
| Modified butadiene or unmodified butadiene | 70 |
| Natural rubber | 30 |
| Carbon black (ISAF) | 45 |
| Zinc white (ZnO) | 3 |
| Stearic acid | 1 |
| Vulcanization accelerator (N-tert-butyl-2-benzothiazolyl sulfeneamide) | 1 |
| Sulfur | 1.5 |

Each of thus vulcanized products was evaluated by measuring the 300% modulus elasticity, rolling resistance index, tensile strength, and wet skid resistance index in the manners described hereinbefore. The results are set forth in Table 2.

TABLE 2

|  | Vulcanized Product | | | | |
| --- | --- | --- | --- | --- | --- |
|  | A | B | C | D | E |
| Polybutadiene | Ex. 1 | Ex. 2 | Ex. 3 | Ex. 4 | Com. Ex. 1 |
| N-content (ppm) | 210 | 190 | 180 | 150 | not found |
| cis-1,4 content (%) | 98.3 | 98.2 | 98.2 | 98.3 | 98.2 |
| Mw (×10$^4$) | 43.5 | 43.0 | 42.9 | 43.5 | 42.0 |
| MW distribution | 2.38 | 2.31 | 2.30 | 2.35 | 2.39 |
| Mooney viscosity | 35 | 34 | 34 | 35 | 33 |
| Gel content (%) | 35 | 34 | 35 | 32 | 30 |
| 300% modulus elasticity (MPa) | 15 | 14 | 15 | 13 | 12 |
| Rolling resistance index | 107 | 105 | 108 | 104 | 100 |
| Tensile strength (MPa) | 19 | 19 | 19 | 20 | 19 |
| Wet skid resistance index | 106 | 103 | 106 | 102 | 100 |

(2) Each of the polybutadiene products (modified or unmodified) produced in Example 1 to 4 and Comparison Example 1 was blended and kneaded according to the formulation set forth in Table 3 and Table 4 utilizing a plasto-mill of Banbury type to prepare an elastomer composition. In this process, the vulcanizing agent was kneaded using a roll. The kneaded elastomer compositions were press-cured at 150° C., for 30 minutes, to prepare Vulcanized Products F, G, H, I, J, K, and L.

TABLE 3

| Components | Amount (weight part) |
| --- | --- |
| Elastomer Mixture | 100 |
| Silica | 50 |
| Silane-coupling agent | 4 or 0 |
| Stearic acid | 2 |
| Zinc white (ZnO) | 3 |
| Sulfur | 1.5 |
| Vulcanization accelerator A | 1 |
| Vulcanization accelerator B | 0.5 |

Remarks:

Silica: Ultrasil VN3 ($N_2SA$: 180 $m^2/g$, available from Degussa Corporation)

Silane-coupling agent: bis(3-triethoxysilylpropyl) tetrasulfide (Si69, commercially available from Degussa Corporation)

Vulcanization accelerator A: N-t-butyl-2-benzothiaz-yl sulfeneamide (Nocseller NS, available from Ohuchi Sinko Chemical Co., Ltd.) Vulcanization accelerator B: N,N'-diphenyl guanidine (Nocseller D, available from Ohuchi Sinko Chemical Co., Ltd.)

Each of thus vulcanized products was evaluated by measuring the 300% modulus elasticity, Lambourn abrasion resistance index, rolling resistance index, and wet skid resistance index.

The Lambourn abrasion resistance index was determined at 20° C., for 5 minutes under a slip ratio of 20% using a Lambourn abrasion tester to measure an abrasion loss. The abrasion resistance index is expressed as a relative value, in relation to the abrasion loss observed in Vulcanized Product K. The higher resistance index means that the abrasion resistance is higher.

The results are set forth in Table 4.

TABLE 4

| | Vulcanized Product | | | | | | |
| --- | --- | --- | --- | --- | --- | --- | --- |
| | F | G | H | I | J | K | L |
| Natural Rubber | 30 | 30 | 30 | 30 | 30 | 30 | 30 |
| Polybutadiene | | | | | | | |
| Com.1 (unmodified) | — | — | — | — | — | 70 | 70 |
| Ex.1 (modified) | 70 | — | — | — | 70 | — | — |
| Ex.2 (modified) | — | 70 | — | — | — | — | — |
| Ex.3 (modified) | — | — | 70 | — | — | — | — |
| Ex.4 (modified) | — | — | — | 70 | — | — | — |
| Silane-coupling agent | 4 | 4 | 4 | 4 | — | 4 | — |
| 300% modulus elasticity (MPa) | 7.8 | 7.2 | 7.5 | 6.9 | 7.0 | 6.5 | 6.0 |
| Lambourn abrasion resistance index | 108 | 103 | 105 | 102 | 101 | 100 | 95 |
| Rolling resistance index | 110 | 105 | 107 | 104 | 102 | 100 | 90 |
| Wet skid resistance index | 108 | 102 | 104 | 103 | 100 | 100 | 98 |

EXAMPLE 5

In a 1.5 L-volume stainless steel-made autoclave having been purged with gaseous nitrogen was placed a solution of 1,3-butadiene in 1 L of a mixture of benzene and $C_4$ distillate (butadiene concentration: 27.9 wt. %, benzene content: 26.9 wt. %, content of $C_4$ distillate mainly composed of cis-2-butene: 45.2 wt. %). To the solution were added 2 mmol. of water and 2.9 mmol. of diethylaluminum chloride. The mixture was then stirred. To the mixture was further added 4.24 mmol. of cyclooctadiene. The autoclave was heated until its inner temperature reached 58.5° C. Then, 0.0087 mmol. of cobalt octoate was added, and polymerization reaction was carried out at 60° C., for 30 minutes. Immediately after completion of the polymerization reaction, 2.0 mmol. of tetramethoxysilane (i.e., elastomer modifying compound) was added to the reaction mixture, and then the reaction mixture was heated at the same temperature, for 120 min., so that the polymerized product was modified.

After the modifying reaction was complete, unreacted gas was discharged, and 500 mL of toluene was added to the modified polymer (i.e., modified polybutadiene) to prepare a toluene solution of the modified polybutadiene. To the toluene solution was added 500 mL of methanol, and the mixture was stirred for 10 minutes. The stirring was terminated, and the content of the autoclave was transferred into a separate vessel of 2 L volume. The modified butadiene was then isolated by filtration. The modified butadiene was then dissolved in 800 mL of toluene, and precipitated by the addition of 800 mL of methanol. The precipitate was then isolated by filtration. This dissolution/precipitation/isolation procedure was repeated three times.

To the finally isolated modified polybutadiene were added 0.11 phr. of Irganox-1010 [oxidation inhibitor: tetrakis (methylene-3-(3,5-di-t-butyl-4-hydroxyphenyl)-propionate) methane] and 0.45 phr. of tris(nonylphenyl)-phosphite (antioxidant or age resister). The mixture was then kneaded, and dried at 100° C., for 1.5 hrs., under reduced pressure, to obtain a modified polybutadiene product.

EXAMPLE 6

The procedures of Example 5 were repeated except for using the same amount of methyltriethoxysilane as the modifying compound, to obtain a modified polybutadiene product.

EXAMPLE 7

The procedures of Example 5 were repeated except for using the same amount of tetraethoxysilane as the modifying compound, to obtain a modified polybutadiene product.

EXAMPLE 8

The procedures of Example 1 were repeated except for changing the amount of tetramethoxysilane to 3.0 mmol., to obtain a modified polybutadiene product.

Characteristics of Vulcanized Polybutadiene Product (1) Each of the polybutadiene products (modified or unmodified) produced in Example 5 to 8 was blended according to the formulation set forth in Table 5 to prepare an elastomer composition. The blended elastomer compositions were press-cured at 150° C., for 30 minutes, to prepare Vulcanized Products M, N, O, and P.

TABLE 5

| Components | Amount (weight part) |
| --- | --- |
| Modified butadiene or unmodified butadiene | 70 |
| Natural rubber | 30 |
| Carbon black (ISAF) | 45 |
| Zinc white (ZnO) | 3 |
| Stearic acid | 1 |
| Vulcanization accelerator | 1 |

TABLE 5-continued

| Components | Amount (weight part) |
|---|---|
| (N-tert-butyl-2-benzothiazolyl sulfeneamide) | |
| Sulfur | 1.5 |

Each of thus vulcanized products was evaluated by measuring the 300% modulus elasticity, rolling resistance index, tensile strength, and wet skid resistance index in the manners described hereinbefore. The results are set forth in Table 6.

TABLE 6

| | Vulcanized Product | | | | |
|---|---|---|---|---|---|
| | M | N | O | P | E |
| Polybutadiene | Ex.5 | Ex.6 | Ex.7 | Ex.8 | Com.Ex.1 |
| Si-content (ppm) | 75 | 64 | 70 | 110 | not found |
| cis-1,4 content (%) | 98.2 | 98.2 | 98.3 | 98.3 | 98.2 |
| Mw (x $10^4$) | 42.5 | 42.0 | 42.4 | 42.5 | 42.0 |
| MW distribution | 2.35 | 2.32 | 2.36 | 2.36 | 2.39 |
| Mooney viscosity | 34 | 33 | 34 | 34 | 33 |
| Gel content (%) | 37.5 | 35.8 | 37.0 | 38.6 | 30 |
| 300% modulus elasticity (MPa) | 12.2 | 12.0 | 12.1 | 12.4 | 12 |
| Rolling resistance index | 103 | 102 | 103 | 105 | 100 |
| Tensile strength (MPa) | 21.3 | 20.9 | 21.0 | 22.5 | 20 |
| Wet skid resistance index | 105 | 103 | 103 | 105 | 100 |

Remarks: Si(silicon)-content was determined on an ash product (obtained by decomposition using sulfuric acid and drying the decomposed product) by Inductively Coupled Plasma Emission Spectroscopy using ICP-AES (UPP-1-MARK-II type, available from Kyoto Chemical Laboratories, Ltd.).

(2) Each of the polybutadiene products (modified or unmodified) produced in Example 5 to 8 was blended and kneaded according to the formulation set forth in Table 7 and Table 8 utilizing a plasto-mill of Banbury type to prepare an elastomer composition. In this process, the vulcanizing agent was kneaded using a roll. The kneaded elastomer compositions were press-cured at 150° C., for 30 minutes, to prepare Vulcanized Products Q, R, S, T and U.

TABLE 7

| Components | Amount (weight part) |
|---|---|
| Elastomer Mixture | 100 |
| Silica | 50 |
| Silane-coupling agent | valuable |
| Stearic acid | 2 |
| Zinc white (ZnO) | 3 |
| Sulfur | 1.5 |
| Vulcanizatian accelerator A | 1 |
| Vulcanization accelerator B | 0.5 |

Remarks:

Silica: Ultrasil VN3 ($N_2SA$: 180 $m^2$/g, available from Degussa Corporation)

Silane-coupling agent: bis(3-triethoxysilylpropyl) tetrasulfide (Si69, commercially available from Degussa Corporation)

Vulcanization accelerator A: N-t-butyl-2-benzothiaz-yl sulfeneamide (Nocseller NS, available from Ohuchi Sinko Chemical Co., Ltd.)

Vulcanization accelerator B: N,N'-diphenyl guanidine (Nocseller D, available from Ohuchi Sinko Chemical Co., Ltd.).

Each of thus vulcanized products was evaluated by measuring the 300% modulus elasticity, Lambourn abrasion resistance index, rolling resistance index, and wet skid resistance index.

The Lambourn abrasion resistance index was determined at 20° C., for 5 minutes under a slip ratio of 20% using a Lambourn abrasion tester to measure an abrasion loss. The abrasion resistance index is expressed as a relative value, in relation to the abrasion loss observed in Vulcanized Product K (which is the same as that set forth in Table 4). The higher resistance index means that the abrasion resistance is higher.

The results are set forth in Table 8.

TABLE 8

| | Vulcanized Product | | | | | | |
|---|---|---|---|---|---|---|---|
| | Q | R | S | T | U | K | L |
| Natural Rubber RSS#3 | 30 | 30 | 30 | 30 | 30 | 30 | 30 |
| Polybutadiene | | | | | | | |
| Com.1 (unmodified) | — | — | — | — | — | 70 | 70 |
| Ex.5 (modified) | 70 | — | — | — | 70 | — | — |
| Ex.6 (modified) | — | 70 | — | — | — | — | — |
| Ex.7 (modified) | — | — | 70 | — | — | — | — |
| Ex.8 (modified) | — | — | — | 70 | — | — | — |
| Silane-coupling agent | 4 | 4 | 4 | 4 | — | 4 | — |
| 300% modulus elasticity (MPa) | 7.9 | 7.2 | 7.5 | 8.5 | 6.9 | 6.5 | 6.0 |
| Lambourn abrasion resistance index | 106 | 102 | 104 | 108 | 102 | 100 | 95 |
| Rolling resistance index | 107 | 103 | 105 | 110 | 102 | 100 | 90 |
| Wet skid resistance index | 105 | 101 | 103 | 108 | 101 | 100 | 98 |

From the results of evaluation of polybutadiene elastomers after vulcanization in the elastomer composition, it is apparent that the modified polybutadiene elastomers of the invention are favorably employable as the tire tread, because they show improved abrasion resistance, rolling resistance, and gripping property. Particularly, the modified polybutadiene elastomers of the invention are advantageously employable in combination with a silica to give more improved abrasion resistance, rolling resistance, and gripping property.

What is claimed is:

1. A process for preparing a modified diene elastomer which comprises the steps of:
   polymerizing a diolefin compound containing a conjugated double bond in a liquid phase in the presence of a cobalt compound, an organic aluminum compound containing a halogen atom, and water, to give a solution containing a diene elastomer; and
   reacting the diene elastomer with an elastomer-modifying compound.

2. The process of claim 1, wherein the diolefin compound containing a conjugated double bond is 1,3-butadiene or isoprene.

3. The process of claim 1, wherein the cobalt compound is a cobalt salt of a carboxylic acid having 1 to 18 carbon atoms.

4. The process of claim 1, wherein the organic aluminum compound containing a halogen atom is a dialkylaluminum halide, an alkylaluminum dihalide, or an alkylaluminum sesquihalide, each of which contains 2 to 10 carbon atoms in total.

5. The process of claim 1, wherein the elastomer-modifying compound is an organic silicon compound having an amino group and an alkoxy group, an organo-alkoxysilane, or an organo-aroxysilane.

6. The process of claim 5, wherein the elastomer-modifying compound is an organic silicon compound having an amino group and an alkoxy group which is selected from the group consisting of 3-aminopropyltrimethoxysilane, 3-(2-aminoethylaminopropyl)dimethoxymethylsilane, and 3-(2-aminoethylpropyl) trimethoxysilane.

7. The process of claim 5, wherein the elastomer-modifying compound is an organo-alkoxysilane or an organo-aroxysilane which has the formula (I):

$$R^1{}_k(R^2O)_m SiH_n \qquad (I)$$

in which each of $R^1$ and $R^2$ independently represents a hydrocarbyl group having 1 to 20 carbon atoms, k is an integer of 0 to 3, m is an integer of 1 to 4, and n is an integer of 0 to 3, provided that k+m+n is 4.

8. The process of claim 7, wherein $R^1$ of the formula (I) represents an alkyl group having 1 to 8 carbon atoms, an aryl group having 6 to 12 carbon atoms, or an aralkyl group having 7 to 13 carbon atoms, and $R^2$ represents an alkyl group having 1 to 10 carbon atoms, an aryl group having 6 to 12 carbon atoms, or an aralkyl group having 7 to 13 carbon atoms.

9. The process of claim 1, wherein the cobalt compound, the organic aluminum compound containing a halogen atom, and water are present, respectively, in amounts of $1\times10^{-7}$ to $1\times10^{-3}$ mol., $1\times10^{-5}$ to $1\times10^{-1}$ mol., and $1\times10^{-5}$ to $1\times10^{-1}$ mol., each being per one mole of the diolefin compound.

10. The process of claim 1, wherein the polymerization of the diolefin compound is performed at a temperature in the range of 30 to 100° C.

11. The process of claim 1, wherein the polymerization of the diolefin compound is performed in the presence of an organic solvent which dissolves the diolefin compound, the diene elastomer, and the modified diene elastomer.

12. The process of claim 1, wherein the reaction of the diene elastomer with the elastomer-modifying compound is performed after addition of the elastomer-modifying compound into the solution containing a diene elastomer.

13. The process of claim 12, wherein the reaction of the diene elastomer with the elastomer-modifying compound is performed at a temperature of room temperature to 70° C.

14. A modified diene elastomer containing at least 80% of cis-1,4-structure units in its recurring units, a Mooney viscosity of 20 to 80 in terms of $ML_{1+4}$ at 100° C., and a weight average molecular weight of 200,000 to 1,000,000 measured by a gel permeation method, which is prepared by a process comprising the steps of polymerizing a diolefin compound containing a conjugated double bond in a liquid phase in the presence of a cobalt compound, an organic aluminum compound containing a halogen atom, and water, to give a solution containing a diene elastomer, and reacting the diene elastomer with an elastomer-modifying compound.

15. The modified diene elastomer of claim 14, wherein the diolefin compound containing a conjugated double bond is 1,3-butadiene and the diene elastomer is polybutadiene.

16. The modified diene elastomer of claim 14, wherein the elastomer-modifying compound is an organic silicon compound having an amino group and an alkoxy group, an organo-alkoxysilane, or an organo-aroxysilane.

17. An elastomer composition comprising an elastomer component which is composed of 10 to 80 weight % of a modified diene elastomer containing at least 80% of cis-1,4-structure units in its recurring units, a Mooney viscosity of 20 to 80 in terms of $ML_{1+4}$ at 100° C., and a weight average molecular weight of 200,000 to 1,000,000 measured by a gel permeation method, which is prepared by a process comprising the steps of polymerizing a diolefin compound containing a conjugated double bond in a liquid phase in the presence of a cobalt compound, an organic aluminum compound containing a halogen atom, and water, to give a solution containing a diene elastomer, and reacting the diene elastomer with an elastomer-modifying compound, and 20 to 90 weight % of one or more other elastomer compounds, and silica in an amount of 5 to 100 weight parts per 100 weight parts of the elastomer component.

18. The elastomer composition of claim 17, wherein a silane coupling agent is further contained in an amount of at most 15 weight parts per 100 weight parts of the silica.

19. The elastomer composition of claim 18, wherein a silane coupling agent is contained in an amount of at most 10 weight parts per 100 weight parts of the silica.

20. A tire tread employing an elastomer composition comprising an elastomer component which is composed of 10 to 80 weight % of a modified diene elastomer containing at least 80% of cis-1,4-structure units in its recurring units, a Mooney viscosity of 20 to 80 in terms of $ML_{1+4}$ at 100° C., and a weight average molecular weight of 200,000 to 1,000,000 measured by a gel permeation method, which is prepared by a process comprising the steps of polymerizing a diolefin compound containing a conjugated double bond in a liquid phase in the presence of a cobalt compound, an organic aluminum compound containing a halogen atom, and water, to give a solution containing a diene elastomer, and reacting the diene elastomer with an elastomer-modifying compound, and 20 to 90 weight % of one or more other elastomer compounds, and silica in an amount of 5 to 100 weight parts per 100 weight parts of the elastomer component.

* * * * *